United States Patent [19]

Ross, Sr.

[11] Patent Number: 4,550,231
[45] Date of Patent: Oct. 29, 1985

[54] TROLLEY RAIL

[75] Inventor: Donald R. Ross, Sr., Pittsburgh, Pa.

[73] Assignee: U-S Safety Trolley Corp., Pittsburgh, Pa.

[21] Appl. No.: 534,816

[22] Filed: Sep. 22, 1983

[51] Int. Cl.⁴ .................. B60M 1/34; B60M 1/24; H01R 11/00
[52] U.S. Cl. .................. 191/23 A; 191/28; 339/22 T; 403/345
[58] Field of Search ............ 191/22 R, 23 R, 23 A, 191/24–29 R, 30, 31, 35, 44.1; 339/22 T; 238/14.4, 14.5; 403/345

[56] References Cited

U.S. PATENT DOCUMENTS

| | | | |
|---|---|---|---|
| 3,399,281 | 8/1968 | Corl | 191/23 R |
| 3,772,482 | 11/1973 | Ross, Jr. | 191/23 |
| 3,793,962 | 2/1974 | Sights | 191/23 R |
| 3,801,751 | 4/1974 | Ross, Jr. | 191/44.1 |
| 3,918,557 | 11/1975 | Ross, Jr. | 191/59.1 |
| 4,050,555 | 9/1977 | Ross, Jr. | 191/23 |
| 4,084,301 | 4/1978 | Ross, Jr. | 29/33 |
| 4,090,594 | 5/1978 | Ross, Jr. | 191/23 |

Primary Examiner—Randolph A. Reese
Assistant Examiner—David F. Hubbuch
Attorney, Agent, or Firm—Carothers & Carothers

[57] ABSTRACT

A trolley rail section includes an elongated housing wherein a conductor junction assembly is retained by virtue of its connection to an elongated conductor within the same housing and with the cooperation of the conductor of an adjacent connected trolley rail section such that the unitary conductor and junction assembly may be assembled into or disassembled from their housing according to a method of assembly when the respective trolley rail section is disconnected from other trolley rail sections.

12 Claims, 5 Drawing Figures

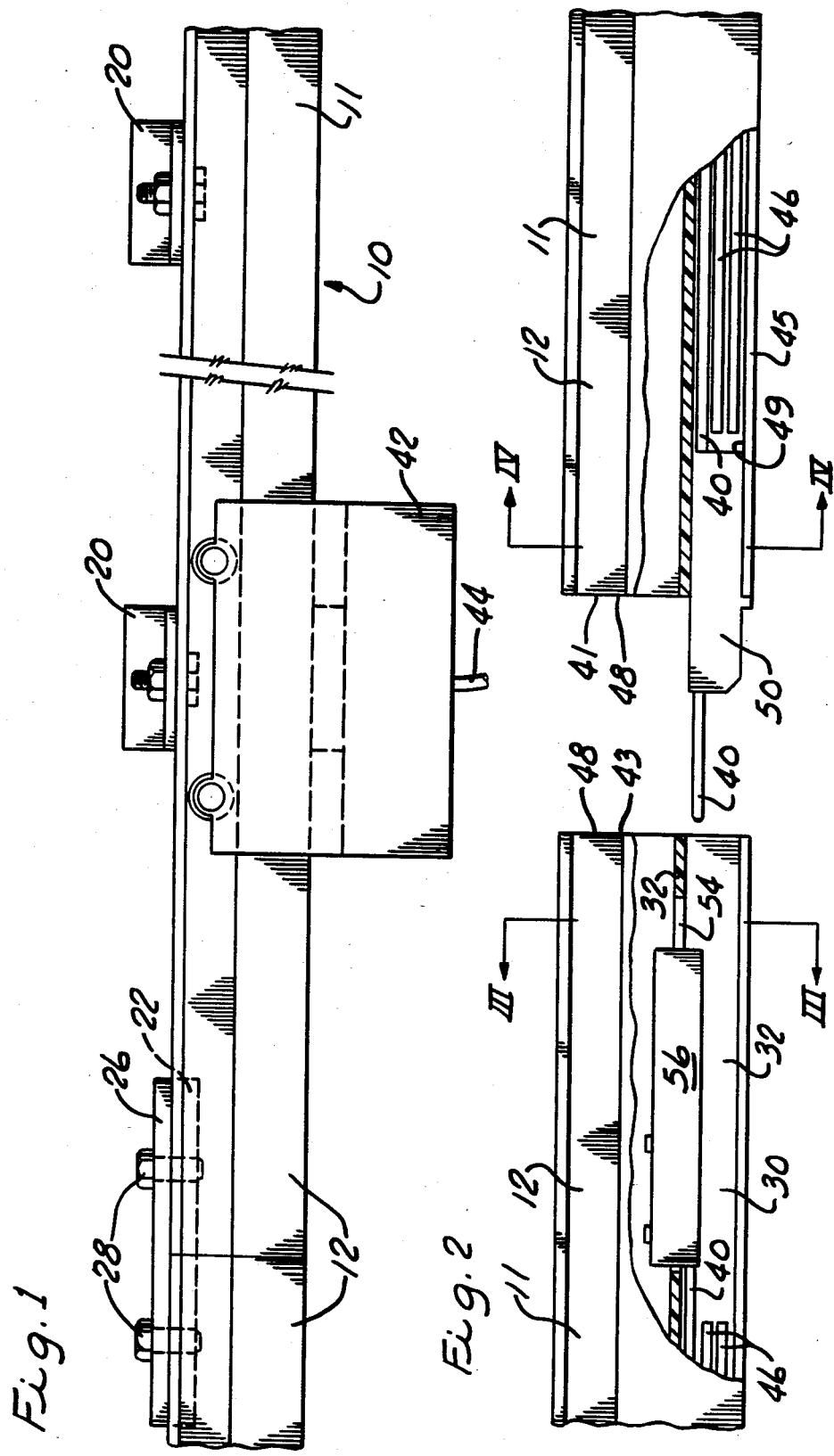

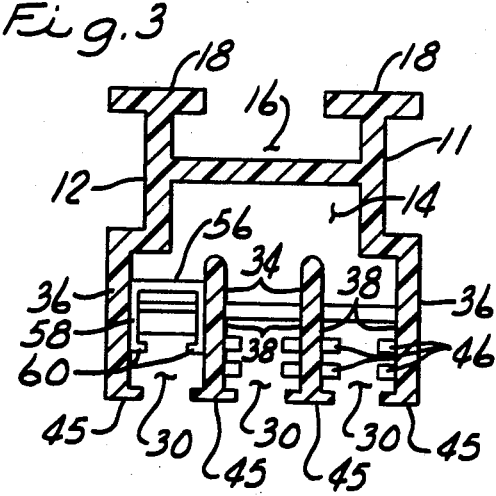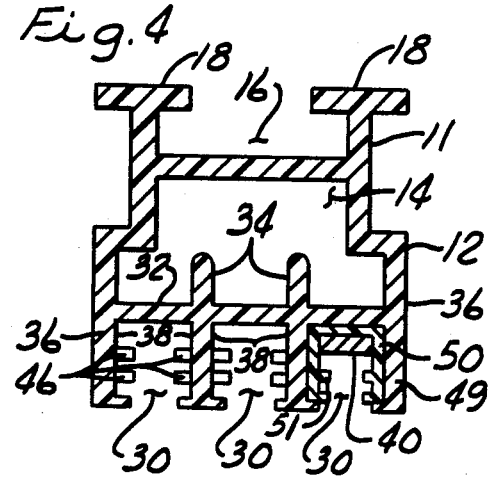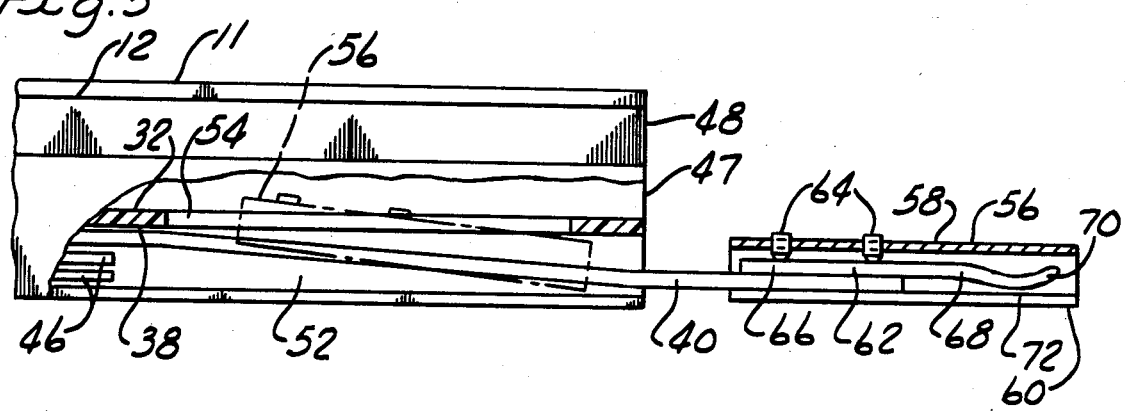

TROLLEY RAIL

It is well known to utilize elongated, multi-bar trolley rail sections in lengths of up to 20 feet or greater to form an elongated run of trolley rail for providing electric power to a movable electric apparatus such as a mine car or a bridge crane from a stationary power source. Such trolley rail sections commonly include an elongated, formed rail of insulating material such as a suitable plastic having defined therein a plurality of longitudinally extending open slots. An elongated electrical conductor such as a copper bus bar commonly resides within each such open slot and is coextensive with the trolley rail section. Each such conductor is accessible as by a shoe or roller of a power pickup through the open side of the respective slot for the purpose of providing electrical power from the stationary power source to the moving apparatus. Accordingly, the power pickup commonly is movable longitudinally of the rail section while maintaining electrical contact with the conductors therein. In practice, a number of such rail sections are connected together end-to-end to form the elongated run of trolley rail and the power pickup is movable along the entire elongated run of trolley rail. Among the prior art of such trolley rails are U.S. Pat. Nos. 3,772,482, 3,801,751, 3,918,557, 4,050,555, 4,084,301 and 4,090,594.

Various approaches to trolley rail section construction have been employed to provide electrically and mechanically sound junctions between the respective conductor bars of adjacent trolley rail sections. Often, however, the resulting trolley rail structures have been difficult and cumbersome to assemble and connect together. By contrast, some prior simplified trolley rail structures have not offered the requisite electrical or mechanical integrity and have proved to be inadequate to the demands of the commonly encountered service environments.

The present invention provides for an improved trolley rail section of simplified construction which is easily assembled and readily connected to or disconnected from mating trolley rail sections whereby simplicity of design and ease of assembly and installation are obtained in a trolley rail section of superior mechanical and electrical attributes. Specifically, the invention concerns a trolley rail section in which a conductor junction assembly may be secured to a conductor prior to assembly of the conductor into the trolley rail section housing. Once installed in the housing, the junction assembly and connected conductor will be positively retained therein and will be mechanically interlocked therein when the trolley rail section is connected to an adjacent rail section. The junction assembly itself includes a combined clamping and spring bias action to provide self aligned joints between adjacent lengths of conductor and suitably sound electrical contact therebetween.

The invention further concerns an improved method of assembling and installing trolley rail sections.

Accordingly, one primary object of this invention is to provide a trolley rail section of the type specified having improved and simplified structural features.

Another object of the invention is to provide simplified and improved electrical conductor connections between adjacent trolley rail sections.

Yet another object of the invention is to provide an improved method of trolley rail section assembly and improved and simplified connection of one trolley rail section to another.

Another more specific object of the invention is to provide a trolley rail section in which the conductor junction assembly is assembled end wise into the housing via the restrictive conductor slot and is mechanically interlocked within the trolley rail section housing when the trolley rail section is connected to an adjacent trolley rail section in an elongated run of trolley rail.

Other objects and advantages appear in the following description and claims.

The accompanying drawings show, for the purpose of exemplification without limiting the invention or the claims thereto, certain practical embodiments illustrating the principles of this invention wherein:

FIG. 1 is a fragmentary side elevation of a trolley rail according to the present invention;

FIG. 2 is a side elevation, partially sectioned, of the mating ends of a pair of adjacent trolley rail sections.

FIG. 3 is a transverse section taken on line III—III of FIG. 2;

FIG. 4 is a transverse section taken on line IV—IV of FIG. 2; and

FIG. 5 is a side elevation, partially sectioned, of a trolley rail end section showing the method of assembly of an electrical conductor and junction assembly into a trolley rail section housing and the structural details of the junction assembly.

Referring to FIGS. 1 through 4, an elongated trolley rail assembly 10 of any desired length is made up of elongated trolley rail sections 12 secured together end-to-end. Each rail section 12 includes an elongated rigid insulating housing 11 of, for example, extruded, high impact polyvinyl chloride. Each housing 11 is of a generally polygonal cross sectional configuration (FIG. 4) and is generally tubular to reduce its weight and to provide a duct 14 for wires and liquid conduits, and for other purposes as desired. In order to secure the run of trolley rail 10 with respect to an adjacent support, the back or top of housing 11 may be provided with a longitudinally extending channel 16. The uppermost ends of the side walls of channel 16 have inwardly extending flanges 18 and conventional suspension members 20 (FIG. 1) include portions thereof disposed in channel 16 beneath the flanges 18 to connect the trolley rail 10 to its support or supports (not shown). The channel 16 also aids in connecting the trolley rail sections 12 together end-to-end. For this purpose, as shown in FIG. 1, an elongated, rigid, formed plate 22 is disposed in channel 16 and straddles the joint between adjacent rail sections 12. Another rigid plate 26 is located on the outer side of flanges 18 adjacent to plate 22 and screws 28 are passed through openings in plate 26 and are screwed into cooperably located threaded holes in plate 22. Screws 28 are tightened down to clamp flanges 28 of the two adjacent rail sections 23 between plates 22 and 26.

The opposite side of each rail section 12, which may be referred to as the bottom or front side thereof depending on how the rail is oriented, is provided with plural, longitudinally extending slots 30 formed in the housing 11. There are at least two slots 30 and usually three or more as shown in FIGS. 3 and 4. The slots 30 may be frontally open throught their length, or more generally, may merely permit frontal access by pickup members travelling along the slots 30. The inner sides of slots 30 opposite their frontal sides are closed by a transversely and longitudinally extending partition wall 32 that also forms the floor or lower wall of duct 14 in the housing 11. Other longitudinally extending partitions 34 intersect partition wall 32 at transversely spaced locations and extend inwardly and outwardly thereof. Partitions 34 in conjunction with the transversely opposite side walls 36 of the housing 11, form side walls which define the slots 30 and isolate each slot 30 from the others. The inner sides of the side walls of each slot 30 are provided adjacent partition wall 32 with a pair of opposed grooves 38 which extend lengthwise of the rail section 12. Commonly, an elongated metal conductor 40 is disposed in each of slots 30 with the edges of conductor 40 extending into respective grooves 38 to retain the conductor 40 in place.

Also formed within slots 30 on the side wall portions thereof are longitudinally extending ribs 46 and intervening grooves which serve to significantly lengthen the surface conducting path between the conductors 40 in adjacent slot 30. In the presently preferred embodiment a frontal inturned flange portion 45 of each side wall of each slot 30 serves to additionally lengthen the surface conducting path. Carbon or other conductive foreign matter may gradually accumulate in slot 30 over time and may contribute to power losses through surface arcing or current bleeding. The ribs 46 and intervening grooves, and flange portions 45 greatly reduce the likelihood of such surface arcing or current bleeding with consequent energy economy and operating efficiency gains.

Commonly, conductors 40 are engaged by current pickup members (not shown) which are carried by a movable carrier 42 so as to extend frontally into respective slots 30 and are movable therealong as carrier 42 moves along trolley rail 10 in the well known manner. The current pickup members may be trolley wheels or sliding shoes supported by carrier 42 and are electrically connected to a conductor means 44 whereby electric power is supplied to an apparatus to be powered thereby.

Inasmuch as the above description pertains to known trolley rail structures, further detailed description thereof is not necessary to those versed in the art for an understanding of the instant invention. The invention concerns certain improvements in the structure of trolley rail sections and the method of assembly thereof so as to provide improved trolley rail sections and superior junctions between adjacent rail sections.

Referring to FIGS. 2 through 5, a joint is formed between respective male and female end portions 41, 43 of a pair of trolley rail sections 12. The joint therebetween preferably provides both a sound mechanical junction between the respective housings 11 and sound electrical and mechanical connections between the respective electrical conductors 40 carried within the slots 30. For purposes of simplicity of description and illustration only the conductor 40 and the related junction for one of slots 30 is shown, it being understood that the conductors and junctions in the other slots 30 are identical. Accordingly, the adjacent ends of housings 11 terminate in mating, generally transverse faces 48.

In male end portion 41 the ribs 46 formed within slot 30 are terminated at a location spaced from end face 48 to provide an enlarged area end portion 49 of the respective slot 30. An elongated insert 50 of insulating plastic for example is secured as by a suitable adhesive within the enlarged end portion 49 of the slot 30 and projects outwardly of the respective end face 48. Insert 50 may be of numerous acceptable designs and for purposes of illustration is shown as an elongated, frontally open, inverted U-shaped member which includes longitudinally extending ribs 51, that are analogous to the above described ribs 46. The conductor 40 passes through insert 50 as shown in FIG. 2 and projects beyond the outermost end of insert 50 for engagement within the female end portion 43 of the adjacent rail section 12.

The female end portion 43 of each rail section 12, like the male end portion 41, includes in each slot 30 ribs 46 which terminate at a location spaced longitudinally from end face 48 of the respective housing 11 to provide an enlarged cross section, elongated end portion 52 of the respective slot 30. Intermediate the longitudinal ends of this elongated end portion 52 there is formed in partition wall 32 an elongated recess 54 shown as a through opening in wall 32 and within which a conductor junction assembly 56 resides. Conductor junction assembly 56 may be of numerous designs, a preferred embodiment thereof being described hereinbelow. For the present, the preferred characteristics of the junction assembly 56 are that it be provided with means to secure therein the adjacent end of the conductor 40 extending within the respective slot 30, and to receive the end of the conductor 40 which projects from the adjacent male end of the other rail section 12 to align the two conductors 40 end-to-end and provide sound mechanical and electrical connection therebetween. Furthermore, junction assembly 56 is of a cross sectional form and size so it may be inserted endwise longitudinally into end portion 52 of slot 30 for asembly into housing 11.

As shown in FIGS. 3 and 5, junction assembly 56 in its preferred form includes a generally inverted, U-shaped, elongated, preferably electrically conductive body 58 having solid back and side walls and inturned, longitudinally extending flanges 60 which define a longitudinally extending open front portion 72 of the body 58. Body 58 is dimensioned externally to be interfitted axially within the female end portion 52 of a slot 30 with suitable clearance to permit it to be angled into recess 54 as described hereinabove. The interior of body 58 is dimensioned to receive therein the conductors 40. Accordingly, one conductor 40 is received into one end of body 58 and is clamped against the interior side of flanges 60 by an electrically conductive backing member 62 of copper, for example. Set screws 64 are threadedly engaged within threaded bores in the back side of body 58 and are tightened down to forcefully engage backing member 62 thereby clamping the end of conductor 40 as shown.

Backing member 62 preferably includes a backup portion 66 which is engaged by set screws 64 and forces conductor 40 against flanges 60 as described, and an integral spring portion 68 which is formed such that a portion thereof extends beyond the end of the clamped conductor 40 and toward the interior side of flanges 60. The outermost end portion 70 thereof turns outward away from flanges 60. A narrow gap 72 is thus formed between spring portion 68 and flanges 60 into which an end of another conductor 40 maybe inserted by forcing the end of the conductor 40 thereinto to overcome the bias of spring portion 68 and displace spring portion 68 away from the flanges 60. Accordingly, in the assembled configuration, junction assembly 56 fixedly secures the end of one conductor 40 by clamping engagement thereof and secures the end of the other conductor 40 by spring biased engagement thereof by a portion of the backing member 62. The backing member 62 and body 58 are both electrically conductive and thus both contribute to the electrical connection between the joined conductors 40.

According to the description hereinabove there is provided by the instant invention an improved trolley rail structure incorporating a novel conductor junction assembly, and a new and improved trolley rail section junction wherein cooperating elements of the conductor junction, the housings and conductors are of simplified, improved and mechanically sound assembly at the junction between two trolley rail sections. Furthermore, an improved method of assembly and fabrication of trolley rail sections is provided by the invention herein.

The invention hereinabove described may be practiced in various alternative embodiments with numerous modifications. For example, the set screws 64 may be substituted by any suitable means for fixedly securing the end of the conductor 40 including permanent securing means such as soaking, crimping or welding. The invention therefore is intended to be broadly construed and limited only by the scope of the claims appended hereto.

The recess or opening 54 and the junction assembly 56 received therein are spaced sufficiently from end face 48 of the housing 11 to provide clearance for the projecting end of insert 50 which is to be received into the extent of slot end portion 52 immediately adjacent to end face 48 upon assembly of the rail sections 12.

It will be understood that all of the rail sections 12, except terminal sections, preferably are identical except as to length, which is indeterminate. Thus, each has a female end and a male end as described hereinabove, and each such female end is engageable with the male end of any other rail section.

In assembly of the rail sections 12, junction assembly 56 is first secured to one end of an elongated conductor 40 which may be a copper bus bar or the like. Conductor 40 is dimensioned such that it may be readily fed endwise into the female end of housing 11 for retention within grooves 38 adjacent to partition wall 32. The full length of conductor 40 is thus passed endwise into slot 30 until the junction assembly 56 secured to the other end of the conductor also passes endwise into slot 30 and is angled into opening or recess 54 as shown in FIG. 5. The end of condcutor 40 is secured adjacent the front of junction assembly 56 and therefore is located adjacent the front or open side of slot 30 when junction assembly 56 is being passed endwise into slot 30; however the portion of conductor 40 already in place in groove 38 is located adjacent to partition wall 32 at the back or rear of slot 30. Thus the conductor 40 must be sufficiently flexible to deform or bend such as shown in FIG. 5 to permit the described assembly procedure. Once in place, the junction assembly 56 is interlocked within recess 54 to preclude any significant longitudinal movement of conductor 40 and the attached junction within slot 30. In addition, conductor 40 is sufficiently rigid, notwithstanding its flexibility, that junction assembly 56 secured thereto normally will not spontaneously drop out of recess 54 and disengage therefrom.

Upon assembly of one rail section 12 with another, the ends of the conductors 40 projecting from the male end of one rail section 12 are passed into the respective slot 30 of the female end of another rail section 12 and are received within respective junction assemblies 56. Before such conductor ends engage the junction assembly 56, the projecting ends of inserts 50 are received within the enlarged ends 52 of respective slot 30 to align and guide respective conductors 40 into engagement with junction assemblies 56. Thus, when the rail sections 12 are assembled together, the projecting end of each isnert 50 is interfitted within the respective slot 30 of the adjacent rail section as described and the respective conductor 40 passes therethrough and is engaged mechanically and electrically with the conductor 40 of the other rail section 12 within junction assembly 56. The ribs 46 of one rail section housing 11 and ribs 51 of the insert 50 projecting into the same rail section housing 11 from the adjacent rail section 12 serve to maintain the portions of conductors 40 adjacent to junction assembly 56 in proper alignment within grooves 38. Junction assembly 56 is thus mechanically interlocked in its operative position within recess 54 as shown in FIG. 2.

It is to be appreciated that the described mechanical interlock of junction 56 is achieved without having to install the junction assembly 56 within the housing 11 prior to connecting it to the conductor 40.

The embodiments of the invention in which an exclusive property or privilege is claimed are defined as follows:

1. In a pair of trolley rail sections wherein an end portion of an elongated electrical conductor of one such rail section is adapted to be connected to an adjacent end portion of an elongated electrical conductor of the other of such rail sections, a junction assembly for connecting such adjacent conductor end portions together comprising:

an elongated electrically conductive formed body member having defined therein a longitudinally extending open interior portion adapted to have retained therein such end portions of such conductors in mutually aligned relationship;

an elongated backing member adapted to be received within said open interior portion of said body member in juxtaposition to such end portion of one of such conductors;

clamping means cooperable with said body member for fixedly securing such end portion of such one conductor and said backing member within said open interior portion of said body member;

said backing member including a backup portion adapted to overlap such end portion of such one conductor and to cooperate with said clamping means for securing thereof within said open interior portion; said backing member including formed extension portion adapted to extend within said open interior portion beyond the extent of such end portion of such one conductor therein;

and said formed extension portion being cooperable with said body member to provide spring biased conductor guiding and securing means for retaining such end portion of the other of such conductors within said open interior portion in longitudinal alignment with the end portion of such one conductor fixedly secured therein.

2. The junction assembly as claimed in claim 1 wherein said backing member is an electrically conductive member.

3. The junction assembly as claimed in claim 1 wherein said body member includes an elongated opening which is longitudinally coextensive therewith and said clamping means and said backing member are cooperable with said body member to retain such end portions of such one and such other conductor within said open interior portion adjacent said elongated opening and in longitudinal alignment therewith.

4. The junction assembly as claimed in claim 3 wherein said body member includes a pair of longitudinally extending generally parallel inturned flange portions which define therebetween said elongated opening.

5. The junction assembly as claimed in claim 4 wherein said clamping means and said backing member are cooperable with said flange portions for retaining such end portions of such one and such other conductor.

6. In a trolley rail adapted to cooperate with a power pickup which is movable therealong for supplying electrical power to a movable apparatus from a relatively stationary power source, the combination comprising;
   an elongated trolley rail housing;
   said housing including at least one elongated slot extending longitudinally thereof;
      an elongated electrical conductor means extending longitudinally within said slot and cooperable therewith in a manner that said conductor means is exteriorly accessible to permit contact thereof by such a power pickup throughout the length of said conductor means;
   retention means cooperable with said slot to positively retain said conductor means in an operative position within said slot;
   said conductor means including an elongated conductor and a conductor junction means secured to one end of said conductor for permitting connection of said conductor means to a conductor means of another trolley rail section;
   said elongated slot and said retention means being formed to permit said elongated conductor and said conductor junction means secured thereto to be passed longitudinally into said elongated slot from one end of said housing during assembly of said conductor means into said housing and to guide said conductor means into said operative position to affect said positive retention thereof.

7. The combination as claimed in claim 6 wherein said retention means includes elongated rib means extending longitudinally of said slot to locate said elongated conductor in said operative position within said slot.

8. The combination as claimed in claim 7 wherein said retention means further includes recess means formed in said slot to receive said conductor junction means therein.

9. The combination as claimed in claim 8 wherein said rib means terminate at a location spaced form said one end of said housing and said recess means is located intermediate said ribs and said one end of said housing.

10. The combination as claimed in claim 9 additionally including elongated insert means adapted to be received into said slot adjacent said one end of said housing to guide such another conductor projecting therefrom into engagement with said conductor junction means in said housing.

11. The combination as claimed in claim 10 wherein said insert means is cooperable with said retention means to mechanically interlock said conductor means within said slot in said operative position.

12. A method of assembling a trolley rail conductor means into a trolley rail housing section comprising the steps of:
   fixedly securing a conductor junction means to one end of an elongated conductor;
   inserting the end of said elongated conductor opposite said one end into one longitudinal end of said housing section;
   passing the entire length of said elongated conductor and said conductor junction means into said housing section;
   during at least a terminal portion of said passing step, moving said elongated conductor to a misaligned orientation within said housing section to guide said conductor junction means into engagement with a conductor retention means;
   and moving said elongated conductor to an aligned orientation coincident with the operative position thereof within said housing section to positively engage said conductor junction means with said conductor retention means for retention of said elongated conductor within said housing.

* * * * *